US007369102B2

(12) United States Patent  (10) Patent No.: US 7,369,102 B2
Luke et al.  (45) Date of Patent: May 6, 2008

(54) SYSTEM AND METHOD FOR NAVIGATING A GRAPHICAL USER INTERFACE ON A SMALLER DISPLAY

(75) Inventors: Hok-Sum Horace Luke, Mercer Island, WA (US); Otto G. Berkes, Seattle, WA (US); David W. Williams, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 938 days.

(21) Appl. No.: 10/694,709

(22) Filed: Oct. 28, 2003

(65) Prior Publication Data
US 2004/0174398 A1 Sep. 9, 2004

Related U.S. Application Data

(60) Provisional application No. 60/451,979, filed on Mar. 4, 2003.

(51) Int. Cl.
*G09G 5/00* (2006.01)
(52) U.S. Cl. .......................... 345/9; 345/440; 345/589; 345/619; 345/629; 345/632
(58) Field of Classification Search ................ 345/1.1, 345/3.2, 9, 204, 426, 440, 589, 619, 629, 345/632, 636, 638, 641, 2, 3
See application file for complete search history.

(56) References Cited

U.S. PATENT DOCUMENTS

| 5,781,195 | A | 7/1998 | Marvin |
| 5,781,196 | A | 7/1998 | Marvin |
| 5,864,337 | A | 1/1999 | Marvin |
| 6,097,371 | A | 8/2000 | Siddiqui et al. |
| 6,374,277 | B2 | 4/2002 | Vong et al. |
| 6,396,487 | B1 | 5/2002 | Jameson |
| 6,628,243 | B1* | 9/2003 | Lyons et al. ................ 345/1.1 |
| 2001/0034661 | A1* | 10/2001 | Ferreira ...................... 705/26 |
| 2002/0077172 | A1* | 6/2002 | Uchiyama et al. ............ 463/20 |
| 2003/0080976 | A1* | 5/2003 | Satoh et al. ............... 345/629 |
| 2005/0028094 | A1 | 2/2005 | Allyn |

OTHER PUBLICATIONS

Canon, Inc. "PowerShot S30: Camera User Guide", pp. 10-13, 93 (2002).
Van Hilst, M., "SAOimage", *Bulletin of the American Astronomical Society*, vol. 22, p. 935 (1990), printed at http://tdc-www.harvard.edu/software/saoimage/publications/saoimage.baas.html on Feb. 19, 2004.
Microsoft Office 2000, "*Accessibility in Microsoft PhotoDraw 2000*", *White Paper*, published Oct. 1998, pp. 1-28.

* cited by examiner

*Primary Examiner*—Bipin Shalwala
*Assistant Examiner*—Vincent E. Kovalick
(74) *Attorney, Agent, or Firm*—Woodcock Washburn LLP

(57) ABSTRACT

Methods for navigating a graphical user interface on a smaller display. One method may include displaying a virtual desktop or a portion of a virtual desktop on a display, displaying a map pane over the portion of the virtual desktop, wherein the map pane includes an internal frame, increasing the opacity of the map pane in response to detecting a cursor over the map pane, and panning the virtual desktop in response to detecting the cursor dragging the frame within the map pane. The map pane preferably includes a scaled down image of the virtual desktop. In one embodiment, the portion of the scaled image of the virtual desktop within the frame in the map pane corresponds to the portion of the virtual desktop displayed on the screen.

48 Claims, 12 Drawing Sheets

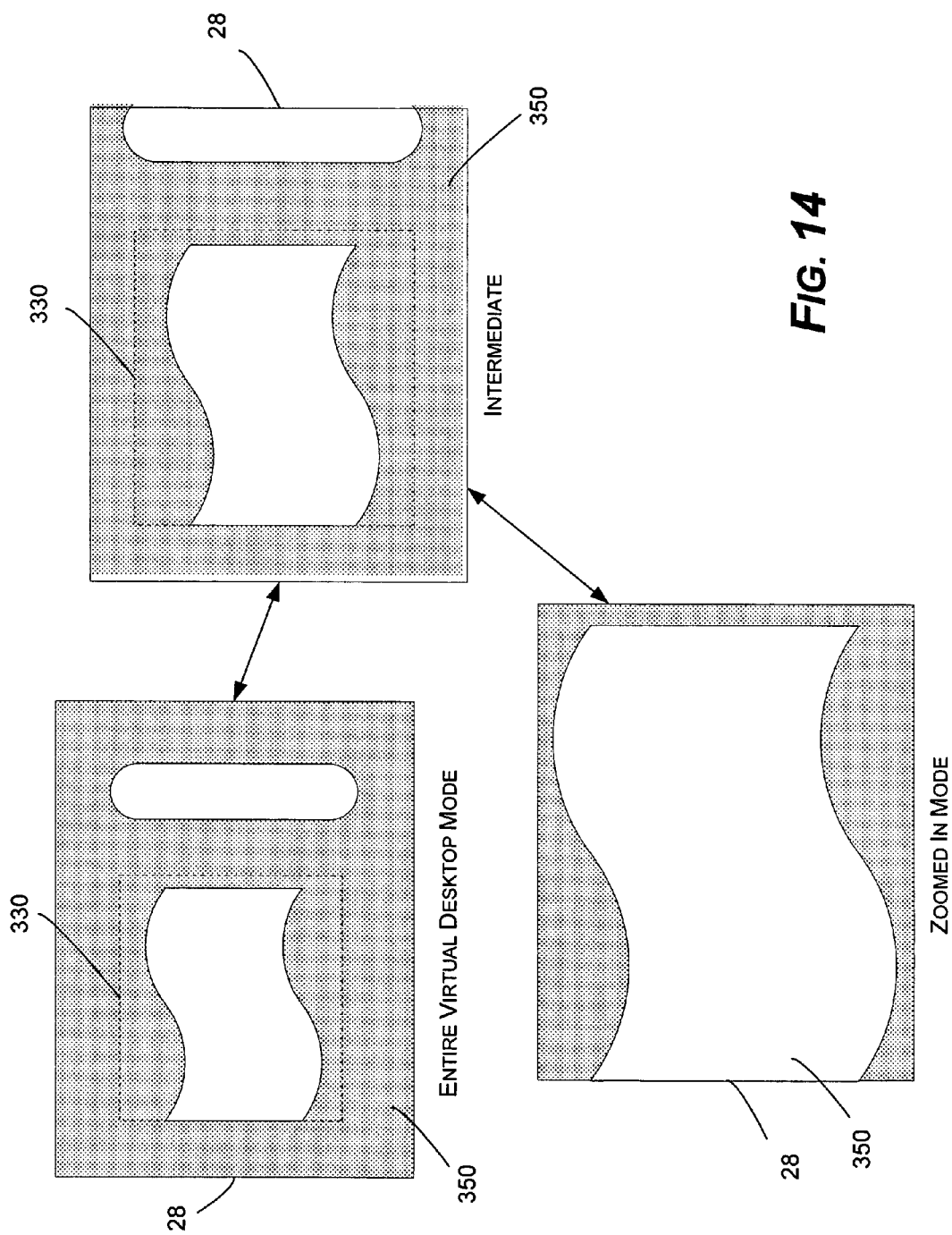

US 7,369,102 B2

SYSTEM AND METHOD FOR NAVIGATING A GRAPHICAL USER INTERFACE ON A SMALLER DISPLAY

REFERENCE TO RELATED APPLICATION

This application claims the benefit of the filing date of U.S. provisional application number 60/451,979, filed Mar. 4, 2003, and incorporated herein by reference.

TECHNICAL FIELD OF THE INVENTION

The present invention pertains generally to graphical user interfaces (GUIs) for computers, and more particularly, to methods for navigating within a graphical user interface.

BACKGROUND OF THE INVENTION

Small, handheld computing devices have been steadily growing in popularity in recent years. The devices go by different names, including, but not limited to, palmtops, pocket computers, personal digital assistants, personal organizers, handheld personal computers and ultramobile personal computers.

In general, handheld ultra-mobile personal computers are small, pocket-sized devices having an LCD (liquid crystal display) with a touch-sensitive screen, a stylus to enter data through the screen, and an input device such as a keypad or miniature QWERTY keyboard. Handheld ultra-mobile personal computers have a microprocessor, memory, and are capable of running an operating system and one or more applications on the operating system.

One of the most desirable characteristics of handheld personal computers is their portability. The compact, portable handheld ultra-mobile personal computers provide a user with real computer or computer-like applications, such as email, PIM (personal information management), an Internet browser, a spreadsheet, and word processing, and practically anything else that a user may do with a conventional personal computer. As examples, a user can receive email messages, schedule meetings or appointments, and browse the Internet from the handheld ultra-mobile personal computer.

Graphical user interfaces (GUIs) for computers are now common. They allow a user to graphically interact with a computer in a more intuitive and flexible manner when compared with command line interfaces (CLIs) or menu-driven interfaces. For example, one particularly popular graphical user interface is provided with the Microsoft Windows XP operating system. While graphical user interfaces work well on personal computers and laptop or notebook computers, some graphical user interfaces do not scale well to small displays such as those found on handheld devices like mobile phones, personal digital assistants (PDAs), and full fledged handheld personal computers.

For example, if a typical personal computer's graphical user interface was displayed on a PDA sized display (e.g., 5" diagonal or less) screen, the text and icons would be too small to be legible (particularly for users who do not have good vision). In addition, navigating and usability within the graphical user interface can be difficult on a small screen. Even if the user is able to discern which icon represents the desired file or application, the icon may be so small as to make it difficult for the user to position the cursor over the icon (target).

SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Systems and methods for navigating a graphical user interface on a smaller display are provided. One method may include displaying a virtual desktop or a portion of a virtual desktop on a display, displaying a map pane over the portion of the virtual desktop, wherein the map pane includes an internal frame, increasing the opacity of the map pane in response to detecting a cursor over the map pane, and panning the virtual desktop in response to detecting the cursor dragging the frame within the map pane.

The map pane preferably includes a scaled down image of the virtual desktop. In one embodiment, the portion of the scaled image of the virtual desktop within the frame in the map pane corresponds to the portion of the virtual desktop displayed on the screen. In an embodiment, the map pane is repositionable within the display. For example, a user may choose to have the map pane in the lower right hand corner, or may choose to have the map pane directly centered on the screen)

In another embodiment, a method includes displaying a virtual desktop or a portion of the virtual desktop on a display. In response to detecting a map pane display input signal from the user (e.g., which may be triggered by a hardware event such as a dedicated or fn+ hardware button), the method displays a map pane showing the portion relative to the virtual desktop, wherein the map pane includes an internal frame for defining the portion relative to the virtual desktop. The method further includes panning the portion in response to detecting a cursor dragging the frame within the map pane. In response to detecting the end of the map pane display signal, the method includes hiding the map pane.

In another embodiment the method may include displaying an image on a display, and, in response to detecting a map pane display input signal from the user, (a) displaying a map pane over a portion of the displayed image by gradually increasing the opacity of the map pane, wherein the map pane includes an internal frame; and (b) panning the displayed image in response to detecting the cursor dragging the frame within the map pane. The panning may be relative to the direction of the cursor movement and is either 1:1 or 1:X in speed of panning.

In an embodiment, a method includes toggling between a first display state and a second display state in response to a zoom button press, wherein the first display state comprises displaying an entire virtual desktop on a display, and wherein the second display state comprises displaying a portion of the virtual desktop on the display. When in the second, zoomed, display state, in response to detecting a pan button press and hold, the virtual desktop may be panned in a corresponding direction. This may be provided, for example, by first zooming back out to the first state (entire desktop), presenting a user with a frame on the display indicating the area of the second state, and then permitting the user to move the frame within the first state to indicate desired display of the second state. Upon releasing of the hardware button, the display automatically returns back to the second state at the selected location. In accordance with another embodiment, a user may press and release the hardware zoom button, causing a toggle between the two states on the display.

In an embodiment, there may be one or more panning buttons, such as one on each corner of the display. The panning buttons may provide panning toward the position of the button, or toward a defined location.

In an embodiment, a method includes toggling between a first task bar state and a second task bar state. One example of a task bar is a task bar such as the start bar implemented in Microsoft Windows XP operating system. The first task bar state comprises a hidden task bar, and the second task bar state comprises a displayed task bar. The displayed task bar is displayed over the virtual desktop in a partially transparent manner, and the task bar dimensions (e.g., width) may be configured to not change, even when the task bar display state changes from the first display state (e.g., hidden) to the second display state (e.g., displayed). Toggling between the first and second task bar states may be provided, for example, by a hardware button or a combination of hardware functions.

In another embodiment, a method may include: toggling between a first display state and a second display state in response to a zoom button press, wherein the first display state comprises displaying an entire virtual desktop on a display, and wherein the second display state comprises displaying a portion of the virtual desktop on the display. When in the first display state, in response to detecting that the zoom button is still pressed after a selected time interval, the method includes displaying a frame around the portion of the virtual desktop that will be displayed in the second display state; in response to a mouse click, centering the frame around the cursor position; in response to a cursor drag, moving the frame in the direction of the cursor drag; and in response to detecting that the zoom button is no longer pressed, toggling to the second display state.

In another embodiment, a method includes toggling between a first display state and a second display state in response to a zoom button press, wherein the first display state comprises displaying an entire virtual desktop on a display, and wherein the second display state comprises displaying a portion of the virtual desktop on the display. When in the second display state, in response to a pan button press and a cursor drag, the method includes panning the desktop in the direction of the cursor drag. When in the first display state, in response to a pan button press, the method includes displaying a frame around the portion of the virtual desktop that will be displayed in the second display state; in response to a mouse click, centering the frame around the cursor position; in response to a cursor drag, moving the frame in the direction of the cursor drag; and in response to detecting that the pan button is no longer pressed, toggling to the second display state.

In yet another embodiment, a handheld portable computing device is contemplated that enables improved navigation and which is configured to include a display, a memory, and a processor configured to read and execute the instructions from the memory. Additionally, a keyboard may be included for accepting user input, wherein a combination of two or more keys on the keyboard pressed concurrently may generate a pan button press. The display may be touch sensitive to enable users to move the cursor, and to drag the cursor by touching the screen (e.g., with a finger or a stylus).

The methods may be implemented in software, hardware, or a combination thereof. A handheld portable computing device configured to perform the methods described is also contemplated.

Other features of the invention will become apparent from the following detailed description when taken in conjunction with the drawings, in which:

BRIEF DESCRIPTION OF THE DRAWINGS

FIG. 14 shows scaling and shifting between a zoomed in mode and an entire virtual desktop mode in accordance with an embodiment.

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Prior to proceeding with a description of the various embodiments of the invention, a description of one embodiment of a handheld computing device will now be provided. As used herein, "handheld computing device" means a small general computing device having a processing unit that is capable of running one or more application programs, a display, and an input mechanism that is typically something other than a full-size keyboard (but a full-size keyboard may be used). The input mechanism may be, for example, one or more of a keypad, a touch-sensitive screen, a track ball, a touch-sensitive pad, a miniaturized alphabetical and/or QWERTY keyboard, or the like.

An example of one embodiment of a handheld computing device 20 is shown in FIGS. 1-4. The handheld computing device 20 of FIGS. 1-4 is embodied as a handheld personal computer. The phrase "handheld computing device" is used throughout this disclosure, and is meant to encompass, inter alia, a personal digital assistant (PDA), a personal organizer, a palmtop computer, a cell phone, a computerized notepad, a pocket computer, a personal organizer, a handheld personal computer, and an ultra-mobile personal computer.

Figure 1:
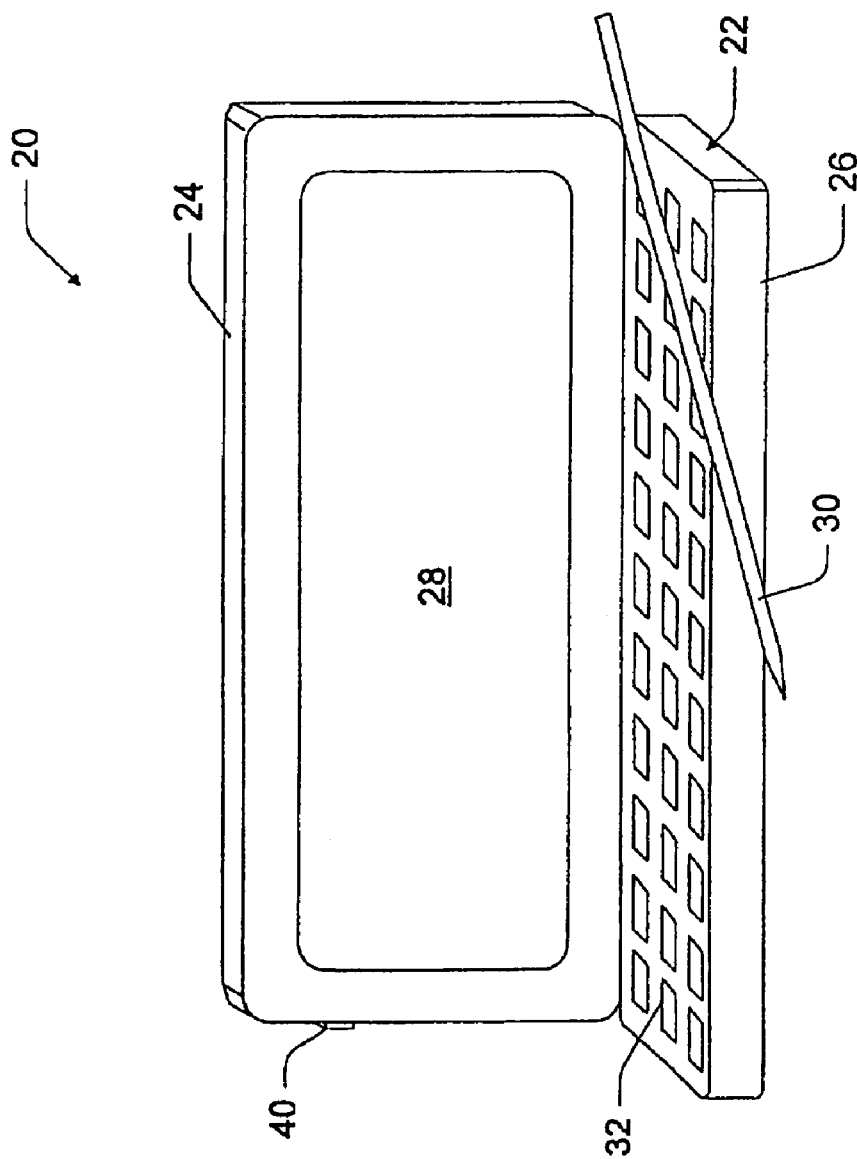
FIG. 1 is a block diagram showing a handheld computing device in an open position.
Figure 2:
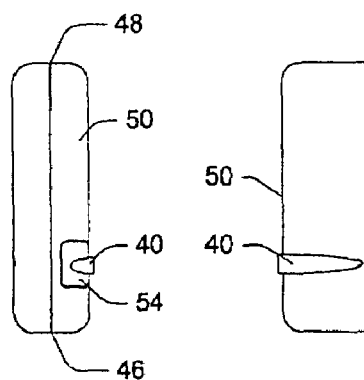
FIG. 2 is a vertical side view of the handheld computing device of FIG. 1, showing the handheld computing device in a closed position.
Figure 3:
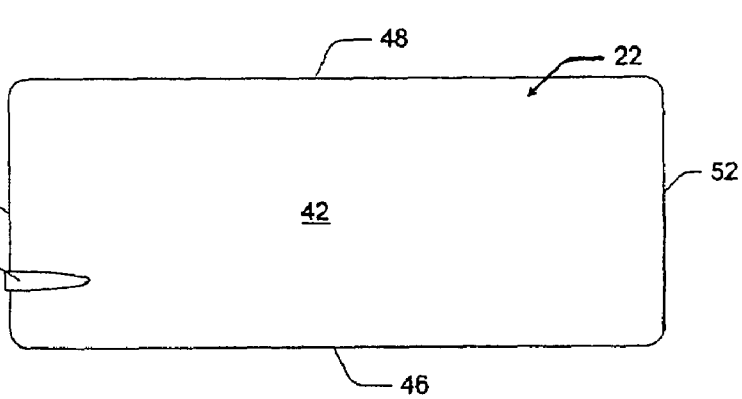
FIG. 3 is a top view of the handheld computing device of FIG. 1, showing the handheld computing device in a closed position.
Figure 4:
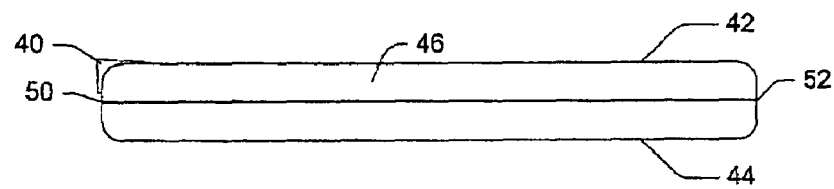
FIG. 4 is a horizontal side view of the handheld computing device of FIG. 1, showing the handheld computing device in a closed position.

The handheld computing device 20 in the embodiment shown in FIGS. 1-4 has a casing 22 with a lid 24 and a base 26. The lid 24 is hingedly connected to the base 26 to pivot between an open position (FIG. 1) and a closed position (FIGS. 2-4). The handheld computing device 20 has a display 28, preferably an LCD (liquid crystal display), having a touch-sensitive screen, and mounted in the lid 24. The handheld computing device 20 is equipped with a stylus 30 to enter data through the display 28 and a miniature alphabetical and/or QWERTY keyboard 32, which are both mounted in the base 26. Other pointing devices other than a stylus may be utilized. Examples of pointing devices include a pointing button, stick or pad, such as are found on many laptop computers, track balls, track pads, and joysticks. While smaller pointing devices that are easy to manipulate with one finger may be preferred for some implementations, a traditional mouse may also be implemented. In such an embodiment, a surface on which to navigate the mouse would typically also be required. The handheld computing device 20 may also be implemented with a wireless transceiver (not shown), such as an IR (infrared) transceiver and/or an RF (radio frequency) transceiver.

Although the illustrated implementation shows a two-component handheld computing device 20 with a lid 24 and a base 26, other implementations of the handheld computing device may comprise an integrated body without hinged components, as is the case with some computerized notepads. Still others may have a slidable lid, or no lid at all. In one embodiment, the handheld computing device 20 does not have a keyboard and does not have a hinged design. It may be configured with a touch screen and one or more buttons (either "soft key" buttons on the screen or hardware buttons on the side of the casing 22 of the handheld computing device 20).

Many manufacturers make suitable handheld personal computers. However, unlike conventional handheld personal computers, the handheld computing device 20 of an embodiment of the present invention is further implemented with a graphical user interface that allows efficient navigation of a large desktop on a small display.

In one embodiment, the handheld computing device 20 runs the Windows brand operating system, with the enhancements described herein to allow efficient navigation of the graphical user interface of that operating system on a small display, such as the display 28. The method described herein may be implemented as part of the operating system, or as part of a graphics device driver or other software. The method may also be implemented in hardware.

In general, as is known, a "cursor" is a movable item, such as symbol, on a display, such as the display 28, that marks a position. The position may be an indication of a current entry position (e.g., where a next character will appear). The symbol may consist, as nonlimiting examples, of an arrow, a solid rectangle, or underline character, and may flash on and off. As used herein, the term "cursor drag," "drag the cursor," or "cursor dragging" means to move a cursor while the curser is in a second, typically not normal, mode. The second mode may be the result of initially pressing a button or a key (e.g., a mouse button, trackball button, shift key or "soft key" on a touch pad or touch sensitive screen or display) before the curser operation, holding a button or key during the curser operation, or another operation with a handheld personal computer. During a cursor drag, the cursor may be changed to indicate that a drag operation is taking place (e.g., the cursor may switch from an arrow shape to an open hand shape or a grasping hand shape).

Figure 5:
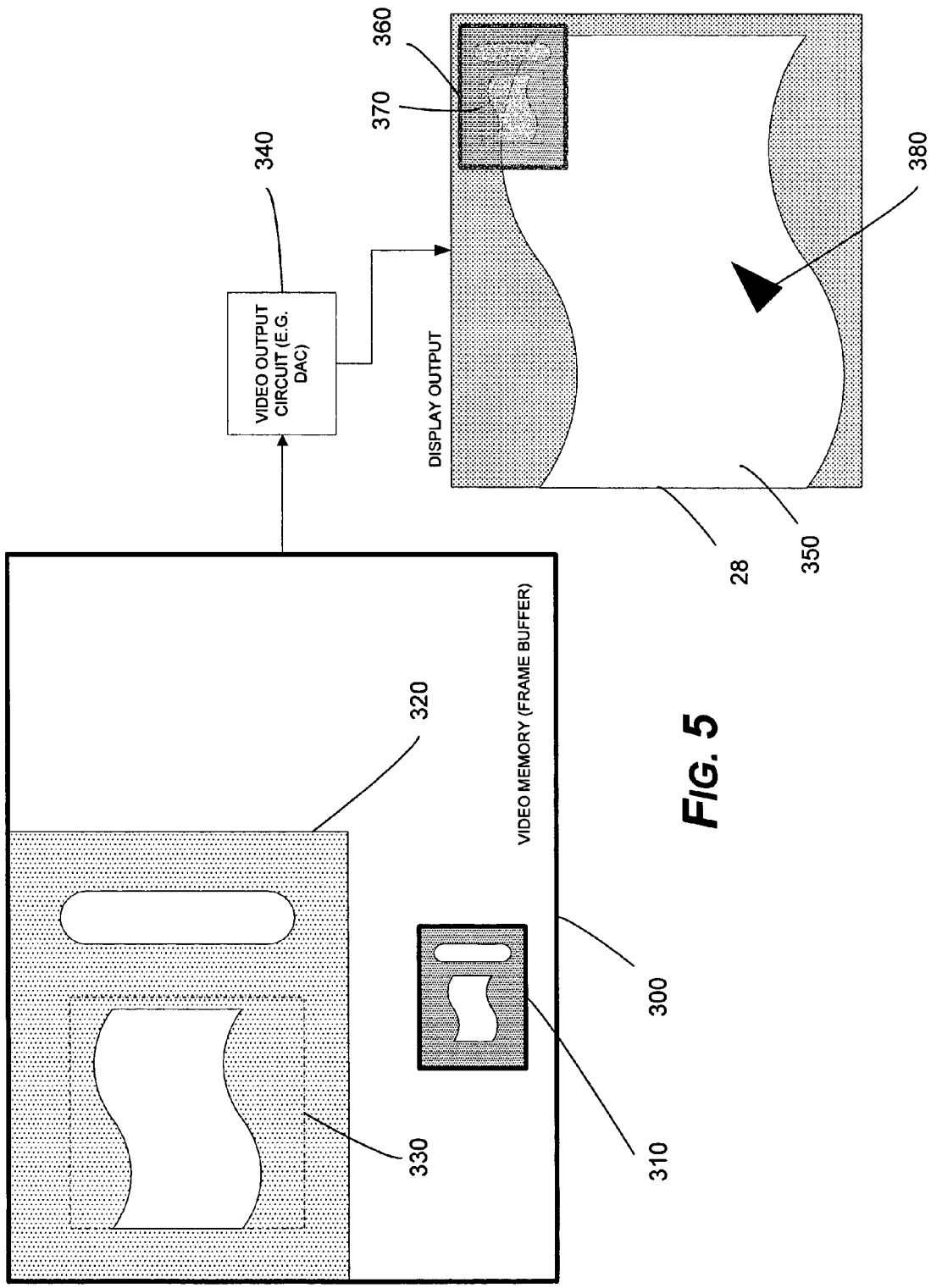
FIG. 5 is a diagrammatical representation of contents of video memory and a display device of a handheld computing device in accordance with an embodiment of the invention.

Turning now to FIG. 5, one embodiment of a method for navigating a large desktop on a handheld computing device (such as the handheld computing device 20) with a small display 28 is shown. In this example, the contents of video memory (Frame Buffer) are illustrated in a block 300. A video output circuit 340 is configured to render portions of the video memory as a displayed image 350 in the display 28.

In the embodiment shown in FIG. 5, a virtual desktop 320 is shown in the block 300, which typically is the entire desktop as an operating system or user interface subsystem of the handheld computing device 20 perceives it. Given a traditional computer display (e.g., 19-inch diagonal), this virtual desktop may be 800×600 pixels, 1024×768 pixels, or other values depending on the amount of memory available and the size of the display 28. The graphical user interface is preferably rendered in color, but black and white or grayscale versions are also contemplated.

In accordance with an embodiment of the invention, a scaled down image 310 of the virtual display is also maintained within video memory (i.e., in the block 300). The function of the scaled down image 310 is described below.

Typically, for most personal computers, the entire virtual desktop 320 is displayed as the displayed image 350 for the display 28. However, in accordance with an embodiment of the invention, as shown in FIG. 5, a "zoomed-in" mode is provided in which a portion (outlined in the block 300 by the dotted line 330) of the virtual desktop 320 is displayed as the displayed image 350 by the video output circuit 340. If desired, as further described below, the handheld computing device 20 may be configured to toggle between displaying the entire virtual desktop 320 ("entire virtual desktop mode") and the portion 330 ("entire virtual desktop mode"). Changes between the entire virtual desktop mode and the zoomed in mode may be made by a suitable operation performed on the handheld computing device 20, such as by pressing a button or selecting a suitable function on the display 28. Other examples are given below.

The video output circuit 340 may also be configured to overlay the scaled down image 310 of the virtual desktop 320 for rendering on the display 28 as part of the displayed image 350. This scaled down image 310 may be displayed, for example, within a map pane 360 that is shown as part of the displayed image 350.

A frame 370 may be displayed within the map pane 360. The frame 370 represents a border around the portion 330 of the virtual desktop 320. A cursor 380 may also be rendered onto the display 28 by the video output circuit 340.

Figure 6:
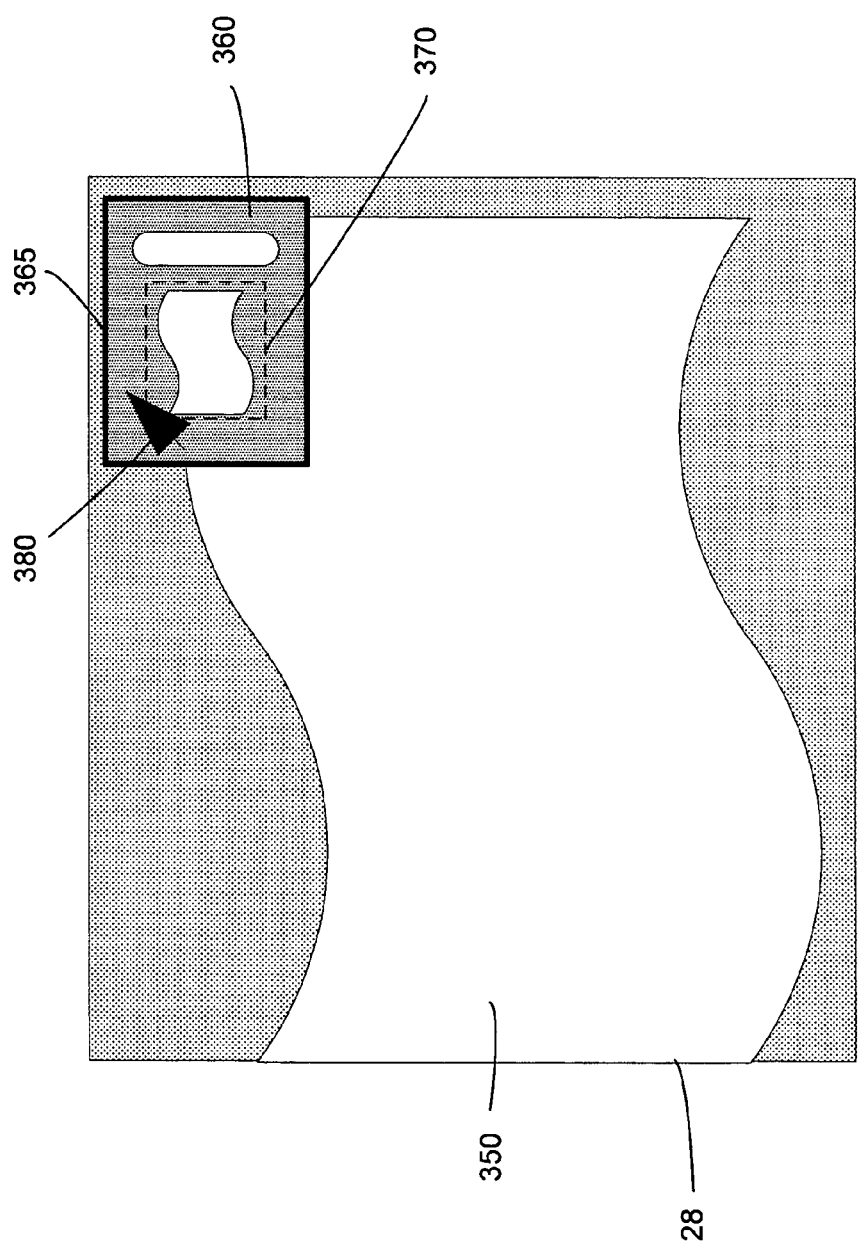
FIG. 6 is a diagrammatical representation of the display depicted in FIG. 5 as it may appear with a cursor positioned over a map pane.

In accordance with an embodiment of the invention, the position and opacity of the map pane 360 varies depending on the position of the cursor 380 relative to the map pane 360 and/or actions taken with respect to the cursor. For example, FIG. 5 shows the display 28 with the map pane 360 slightly translucent, and FIG. 6 shows the map pane more opaque. In FIG. 5, the cursor 380 is away from the map pane 360, and thus the map pane is less opaque. In FIG. 6, the cursor 380 has been moved so that it is positioned over the map pane 360, causing the map pane to be more opaque. In this example, the map pane 360 is configured to become more opaque when the cursor 380 is positioned over the map pane 360. Other actions may be used to make the map pane 360 more opaque, such as depressing a hardware button or buttons, taking a different action with respect to the cursor 380 (e.g., double click on an empty part of the screen), as examples.

In accordance with one embodiment, the frame 370 may be manipulated (e.g., by the cursor 380) to change which portion 330 of the virtual desktop 320 is displayed as the displayed image 350. For example, turning now to FIG. 7, using the example of FIG. 5, the frame 370 has been dragged by the cursor 380 to a new position within the map pane 360. In response thereto, a different corresponding portion 330 of the virtual desktop 320 is displayed within the displayed image 350. As such, this feature allows a user to pan and control which portion 330 of the virtual desktop 320 is displayed. The actual portion 330 displayed as the displayed image 350 is represented by the frame 370 within the map pane 360. If desired, the portion 330 may change dynamically as the frame is moved within the map pane 360.

As described above, moving the frame 370 may occur by dragging the frame with the curser 380. In accordance with one embodiment, when the cursor 380 is within the frame 370, it may be changed into an open hand (not shown), indicating that the frame 370 is repositionable. Other indications may be used. In addition, if desired, other means may be used for moving the frame, such as separate user interfaces (e.g., buttons or other pointers). Some examples are described below.

Figure 8:
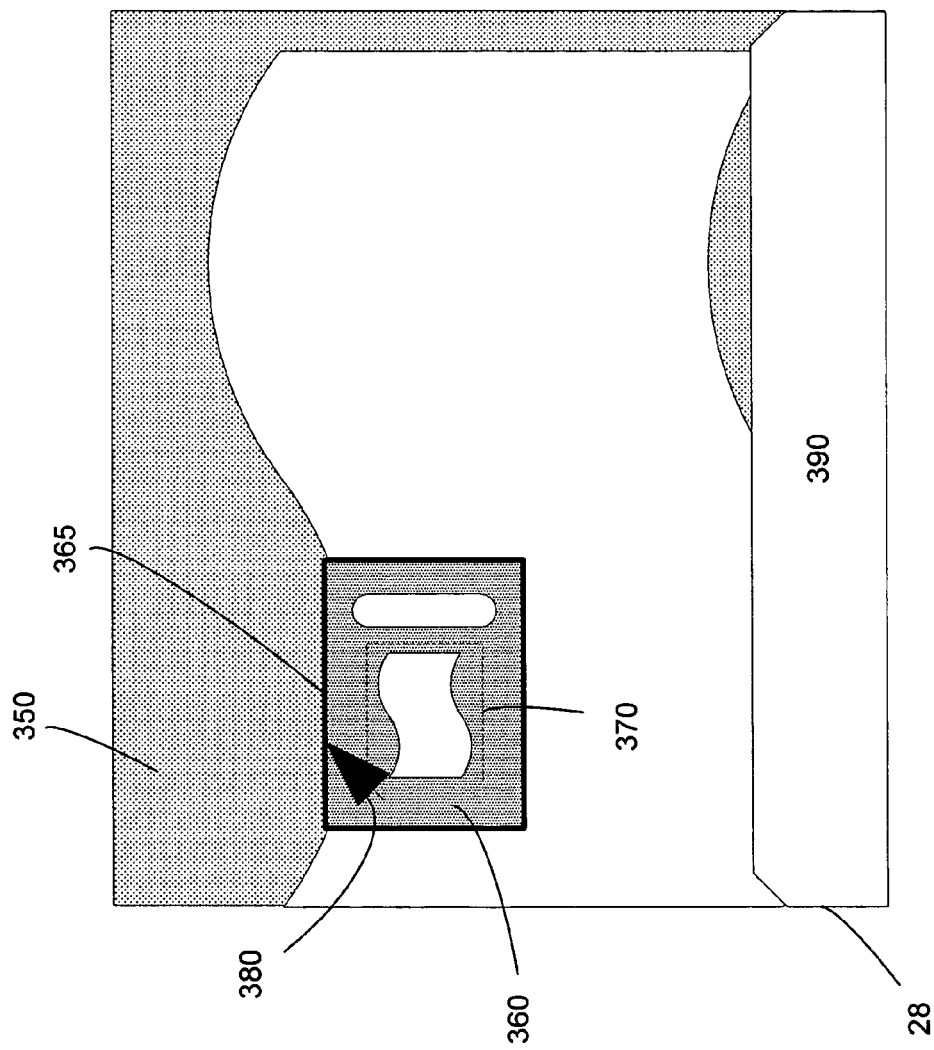
FIG. 8 is a diagrammatical representation of the display device of FIG. 5 as it may appear when the position of the map pane on the display device has been changed as the result of the cursor having dragged an edge of the map pane.

Turning now to FIG. 8, using the example of FIG. 5, the position of the map pane 360 on the displayed image 350 virtual desktop 320 has been changed as the result of the cursor 380 having dragged a surrounding border 365 of the map pane 360 (not to be confused with the frame 370, which resides within the map pane 360). In accordance with an embodiment, moving the map pane 360 in this manner does not alter the portion 330 of the virtual desktop 320 shown as the displayed image 350. Only the position of the map pane 360 is changed.

As described above, moving the map pane 360 may occur by dragging the surrounding border 265 of the map pane 360 with the curser 380. In accordance with one embodiment, when the cursor 380 is on the border 265 and capable of moving the frame 370, the cursor 380 may be changed, such as flashing, a change in icon, or a reconfiguration of the icon already used. In addition, if desired, other means may be used for moving the map pane 360, such as separate user interfaces (e.g., buttons or other pointers).

In accordance with an embodiment, a user may click outside of the frame 370 but still within the surrounding border 365 of the map pane 360 to center the portion 330 of the virtual desktop 320 at the targeted point. Such flexibility affords re-centering of the displayed image 350. If desired, moving the cursor 380 outside of the frame 370, but within the surrounding border 365 of the map pane 360, causes the cursor 380 to change (e.g., become a pointing finger) to indicate that the re-centering feature is available.

For example, as shown in FIG. 6, the end of the cursor 380 is positioned outside of the frame 370, but within the surrounding border 365 of the map pane 360. As discussed above, if desired, positioning the cursor 380 in this position may cause the cursor 380 to change configuration, such as to change the cursor 380 a pointing finger (not shown). Clicking or otherwise selecting the cursor 380 in this area causes the frame 370 to re-center on the clicked point.

In accordance with an embodiment, if the place selected for re-centering is close to the surrounding border 365 of the map pane 360, then the frame 370 will be positioned to the closest point available in which the frame remains within the surrounding border 365 of the map pane 360. Upon clicking the map pane 360 in this area, the portion 330 of the virtual desktop 320 immediately shifts to reflect the new position of the frame 370.

Figure 7:
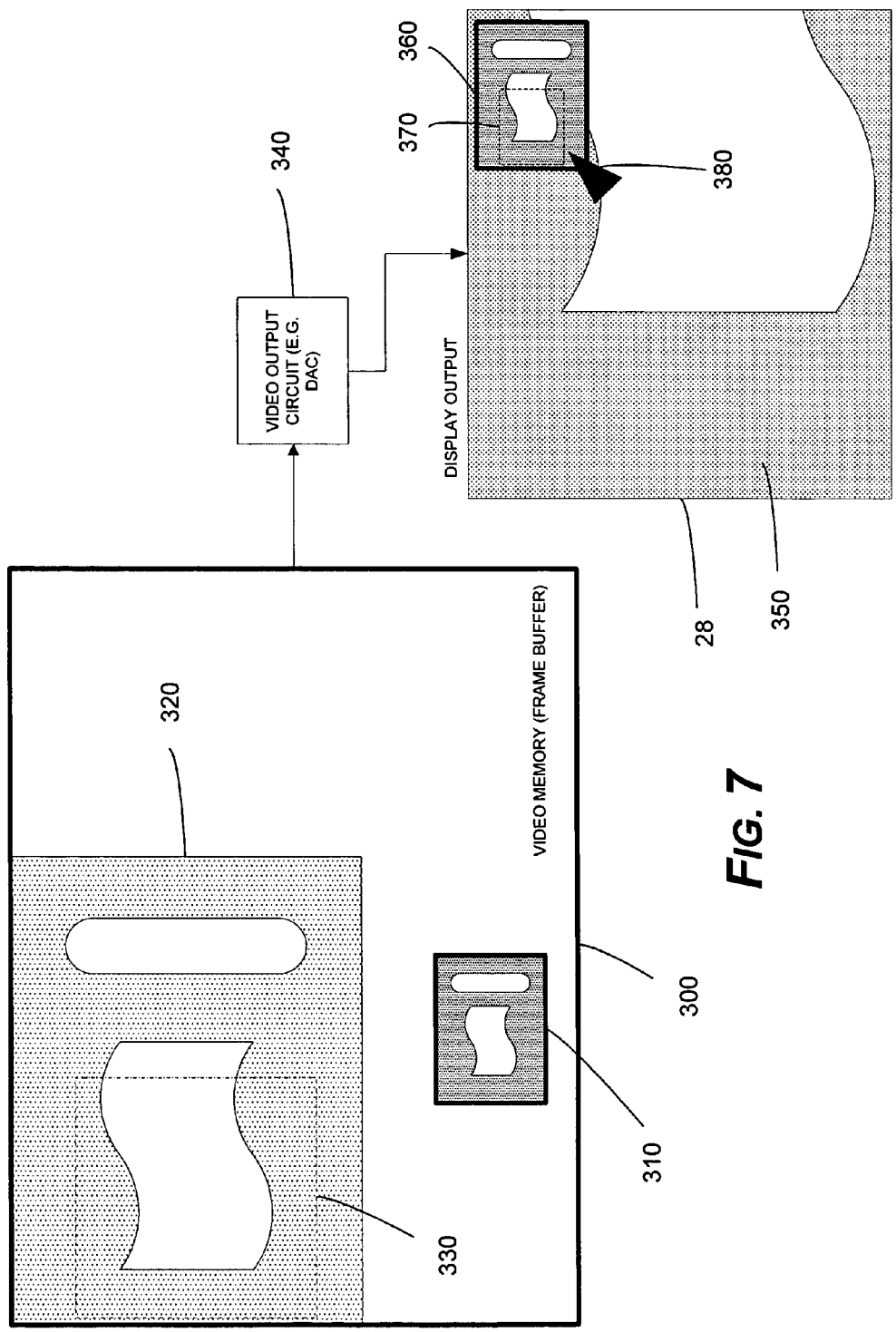
FIG. 7 is a diagrammatical representation of contents of video memory and the display device of a handheld computing device in accordance with another embodiment of the invention.

Re-centering of the frame 370 and the portion 330 of the virtual desktop 320 is shown in the displayed image 350 in FIG. 7. As can be seen, the portion 330 has been moved to the extreme left centered portion of the virtual desktop 320, which is consistent with the movement of the frame 370 responsive to clicking of the cursor 380 in the a left, centered side of the virtual desktop 320 as positioned in FIG. 6.

Figure 9:
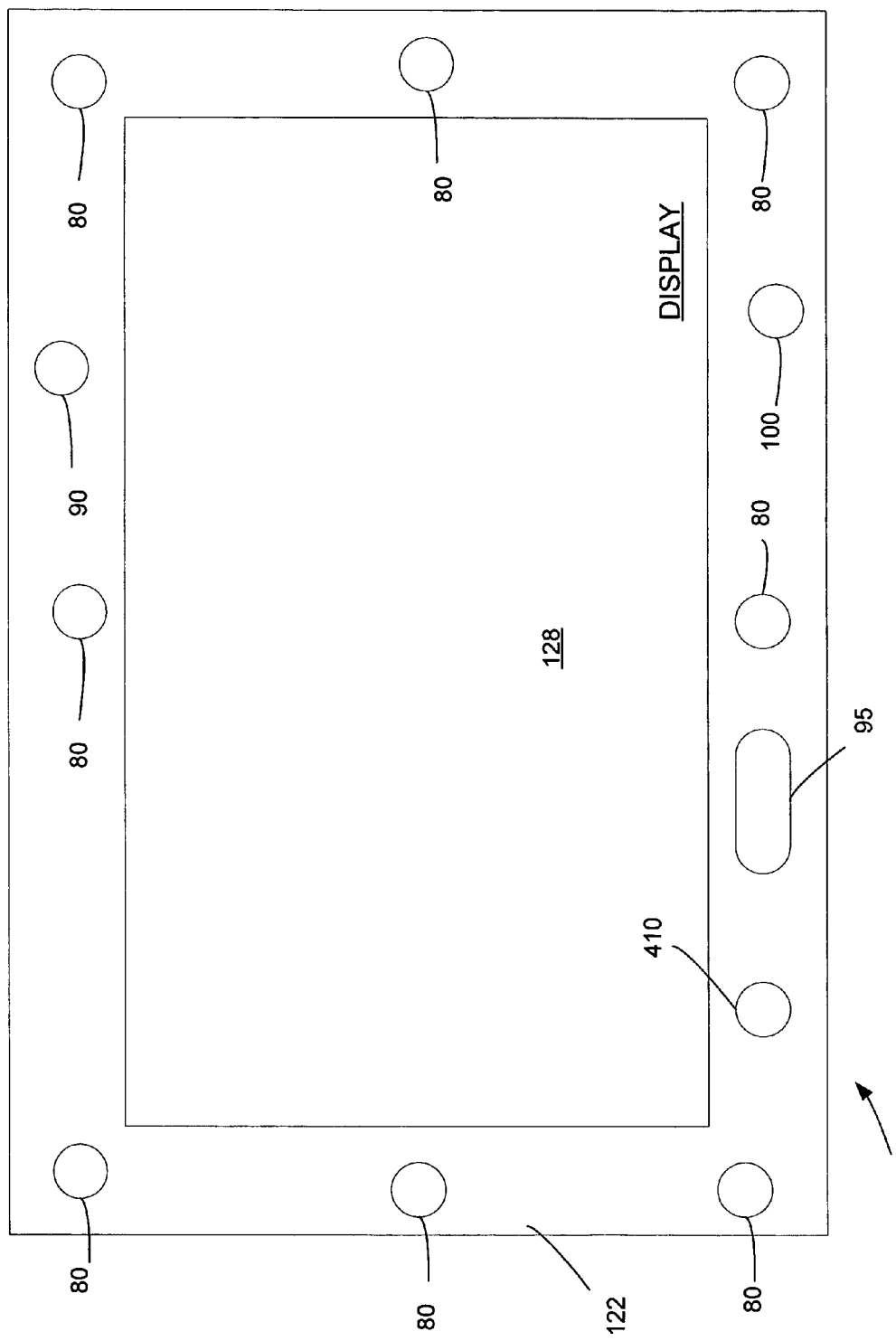
FIG. 9 is a block diagram of another embodiment of a handheld computing device, having as additional components one or more hardware panning buttons, a zoom button, and a zoom indicator LED.

Turning now to FIG. 9, another embodiment of a handheld computing device 120 is shown. This embodiment includes a number of features, some of which are helpful in describing further embodiments of the systems and methods of the present invention. In this embodiment, the handheld computing device 120 comprises a casing 122 with a display 128. Around the display 128 are one or more panning buttons 80 and a zoom button 100. These panning buttons 80 and the zoom button 100 may be "hardware" buttons; e.g., physical buttons located along the outer edges of the casing 122 of the handheld computing device 120. The buttons 80, 100 may alternatively be provided on the display 128 and may be actuated by selection, e.g., clicking. The display 128 is preferably a touch-sensitive LCD that allows users to mouse click and cursor drag using a finger or a stylus.

In this embodiment, the handheld computing device 120 also includes a zoom indicator LED 90. This zoom indicator LED 90 may be turned on or off, for example by the operating system (not shown) or a display device driver (also not shown), to indicate whether the virtual desktop 320 is in a first zoomed-in state (e.g., showing the portion 330 of the virtual desktop 320) or a second zoomed-out state (e.g., showing more of the virtual desktop 320, such as its entirety). The handheld computing device 120 may also or alternatively have a speaker (not shown) to provide an audio signal to the user during zooming and panning operations. The handheld computing device 120 also preferably includes a pointing device, such as the pointing device 30.

In accordance with one embodiment, the map pane 360 is provided as a pop-up window. In this embodiment, the panning buttons 80 may be used. For the convenience of the reader, throughout the disclosure reference will be made to the user pressing and/or holding one panning button 80. It is to be understood that in different embodiments, as desired, either a single panning button 80 may be used, or a plurality of panning buttons 80 may be used.

Figure 10:
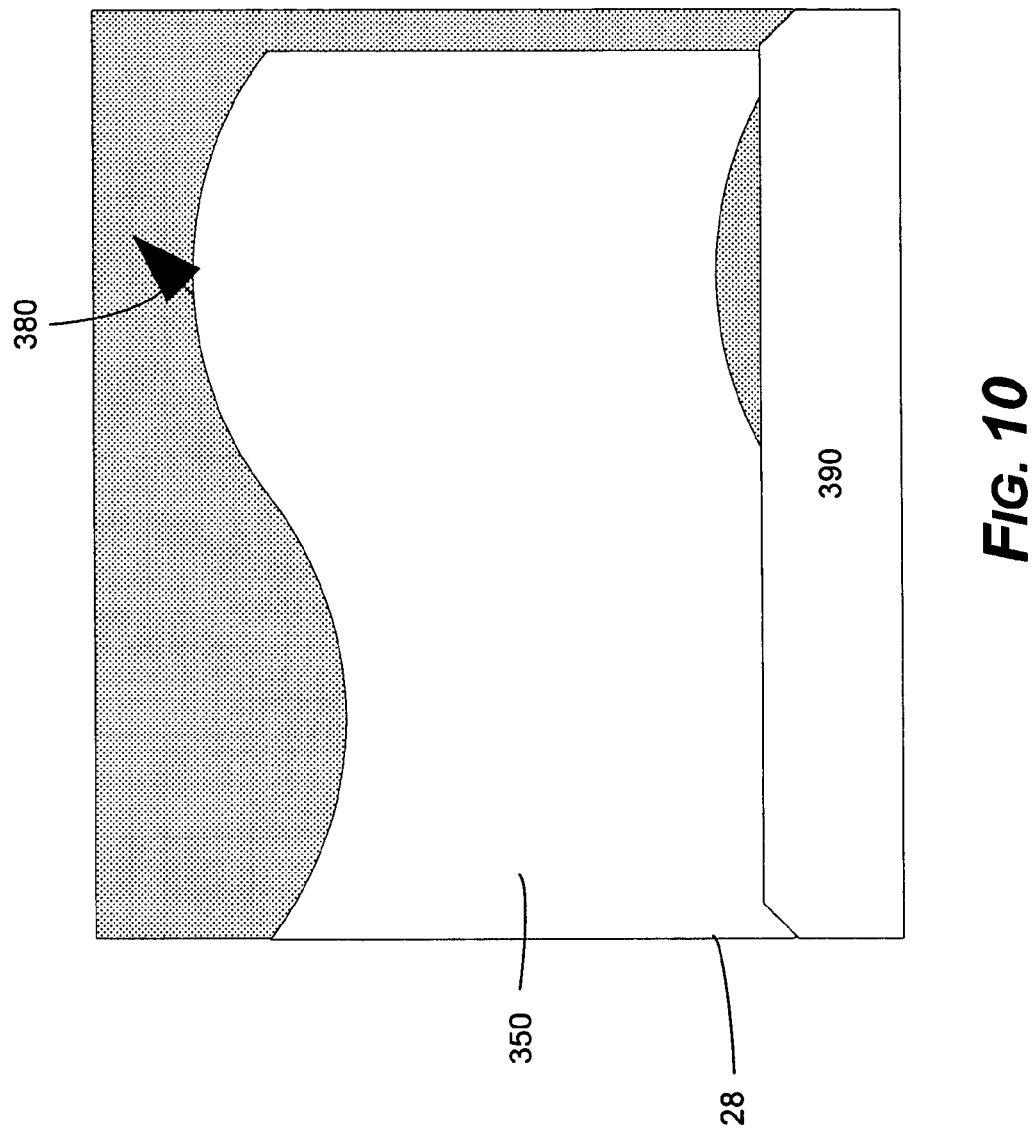
FIG. 10 is a diagrammatical representation of a zoomed mode for a display device in accordance with an embodiment of the invention.
Figure 11:
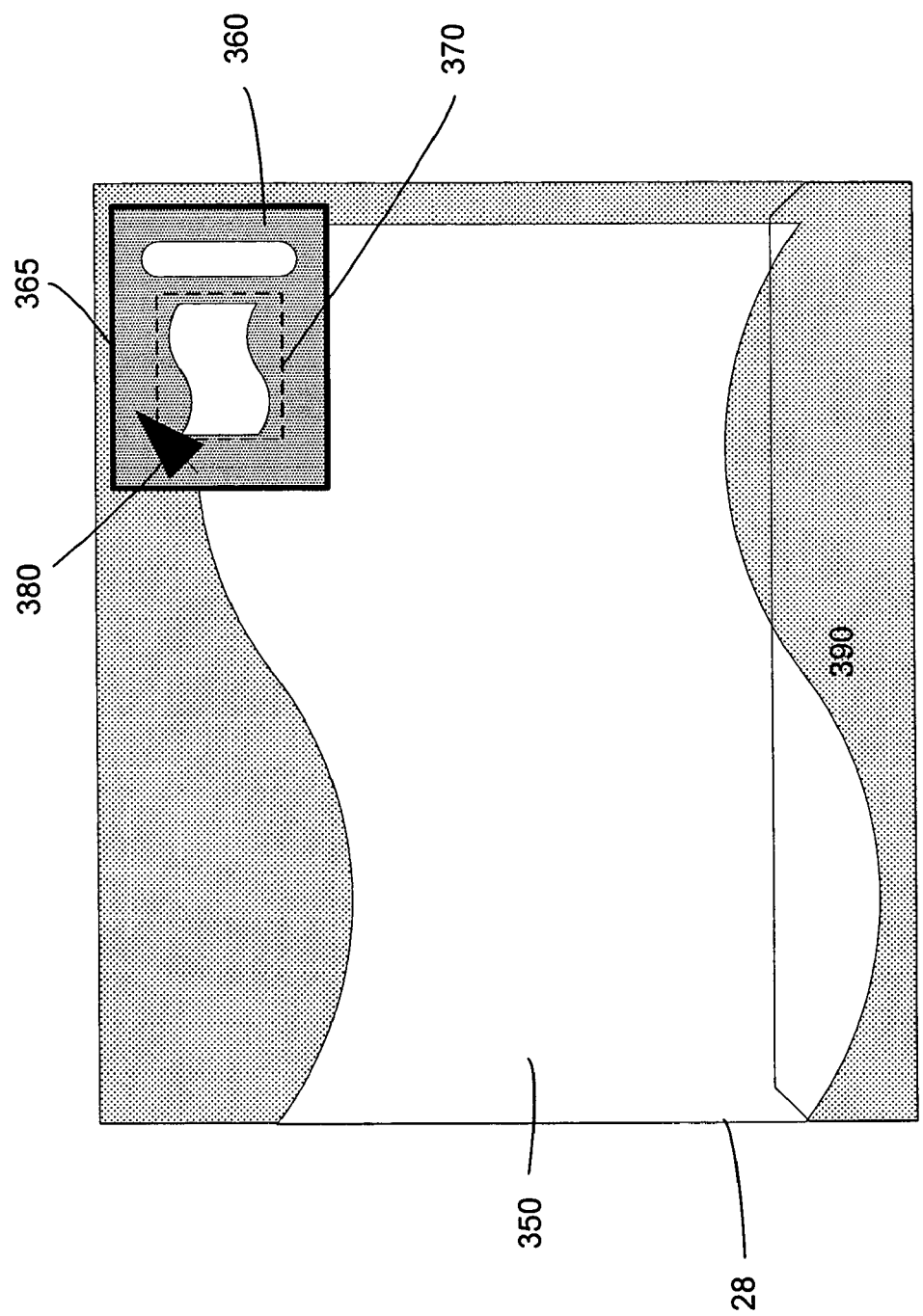
FIG. 11 is a diagrammatical representation of a zoomed mode for a display device, similar to FIG. 10, and showing a map pane and translucent task bar in accordance with an embodiment of the invention.

In any event, in accordance with this embodiment of the invention, the map pane 360 is not visible by default. Thus, the displayed image 350 will have, for example, a normal appearance of either the entire virtual desktop 320 (entire virtual desktop mode) or a portion 330 of the virtual desktop 320 (zoomed in mode, shown in FIG. 10), without the map pane 360 being visible. However, upon positioning the cursor 380 at a desired location on the virtual desktop 320 and then performing a predefined function (e.g., pressing and holding a panning button 80), the user causes the map pane 360 to appear at the location of the cursor 380 (FIG. 11). The map pane 360 may then be utilized as described above.

Alternatives may be utilized for popping up the map pane 360. For example, the user may hold down the panning button 80 on the handheld computing device 120, and then click the pointer anywhere on the displayed image 350. In accordance with an embodiment, the point at which the cursor 380 is clicked on the display 128 is the position at which the map pane 360 will pop up. If desired, the map pane 360 may slowly increase in intensity, or may instantly be available to a user.

If a pop-up map pane 360 is used, in accordance with one embodiment, the map pane 360 always pops up so that it is fully visible on the display 128. To this end, if the cursor 380 indicates a position close to an edge of the display 128, so that a centered map pane 360 would extend beyond an edge of the displayed image 350, then the map pane 360 is placed at the closest point to the position of the cursor 380 at which the map pane 360 would still remain entirely within the displayed image 350. The map pane 360 may alternatively have a default pop-up position, such as the middle of the display 28.

In accordance with an embodiment, when using the pop-up map pane 360, after the map pane is visible, it may fade out after a preset interval, i.e., 3 seconds. In addition, if desired, the map pane may remain visible while a user is using it (for example to move the frame 370), and then may fade out after use, perhaps after a period of nonuse.

Figure 13:
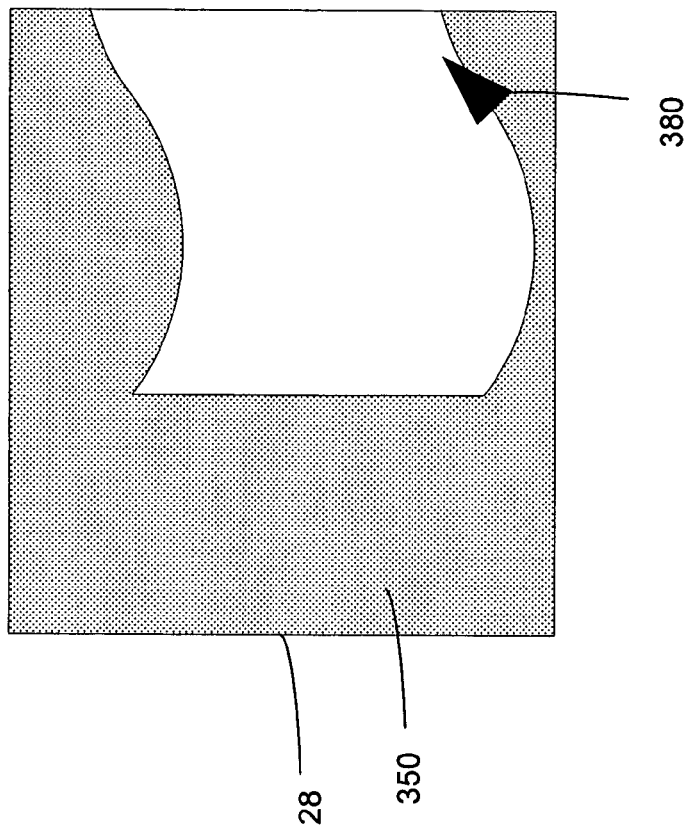
FIGS. 12 and 13 show representations of panning of a virtual desktop while showing only a portion of the virtual desktop in accordance with one embodiment.
Figure 12:
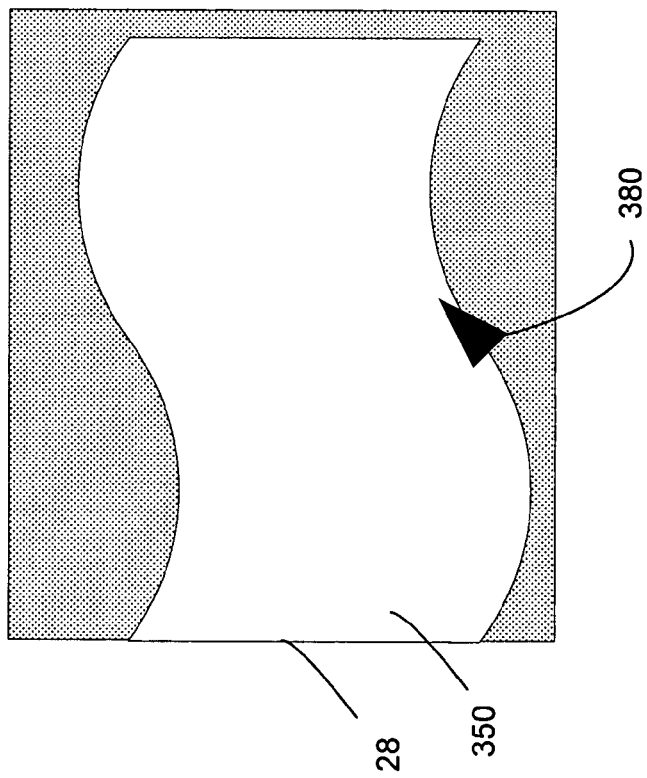

In accordance with one embodiment, a user may click and drag the displayed image 350 while in the zoomed in mode and the portion 330 of the virtual desktop 320 that is visible will be moved along with the cursor 380. For example, as shown in FIGS. 12 and 13, the cursor 380 is positioned at a location on the displayed image 350. Selecting the cursor 380 at this position and moving it to the right causes the visual portion 330 of the virtual desktop 320 to move to the left, showing the displayed image 350 in FIG. 13. If desired, the map pane 360 may be utilized in this embodiment, and may either move with the displayed image 350 or may remain stationary, and the frame 370 within the map pane 360 may move according to the movement of the portion 330 of the virtual desktop 320 that is being moved.

If desired, the zoom button 100 may be used to toggle the displayed image 350 between zoomed in mode (i.e., where a portion 330 of the virtual desktop 320 is shown) and entire virtual desktop mode (i.e., the entire virtual desktop 320 is shown as the displayed image 350). In accordance with an embodiment of the invention, when the displayed image 350 is changed from zoomed in mode to entire virtual desktop mode, the viewable portion 330 of the virtual desktop 320 scales and shifts in position dynamically to reinforce the relationship of the zoomed in view relative to the entire virtual desktop mode. This feature is shown in FIG. 14. As can be seen in the figure, in an intermediate position, the portion 330 is becoming more centered, reinforcing the relationship of the zoomed in mode and the entire virtual desktop mode. This feature can be utilized when moving from the zoomed in mode to the entire virtual desktop mode and vice versa. The steps of intermediate position display may vary depending on the quality of animation.

If desired, complete toggling between the entire virtual desktop mode and the zoomed in mode may be provided by one function (e.g., pressing and releasing the zoom button 100), and partial toggling (i.e., so as to stop at an intermediate position) may be provided by a second function (e.g., pressing and holding the zoom button 100).

Figure 15:
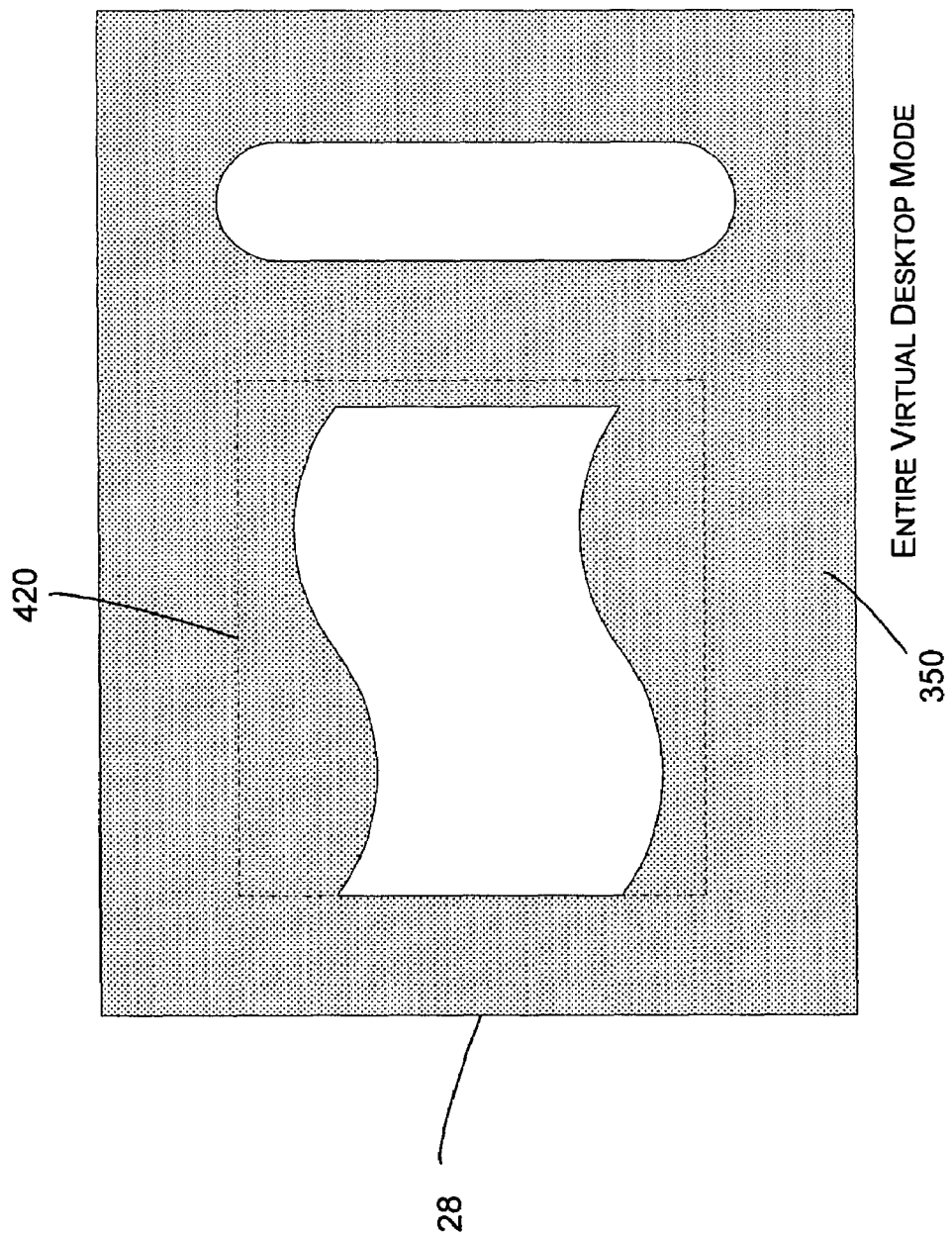
FIG. 15 is a diagrammatical representation of an entire virtual desktop having a zoomed in frame in accordance with an embodiment.

In accordance with one embodiment of the invention, when the displayed image 350 is in the entire virtual desktop mode such as is shown in FIG. 15, then a zoomed in frame 420 may be provided. The zoomed in frame 420 represents the extents of the viewable region of the virtual desktop 320 when in the zoomed in mode (i.e., the portion 330). If viewing of an intermediate (i.e., between the zoomed in and the entire virtual desktop modes) is provided, then the zoomed in frame may be provided in that intermediate mode.

If desired, the zoomed in frame 420 may be visible, but translucent, at all times that the entire virtual desktop mode is shown. Alternatively, a mechanism may be provided for showing the zoomed in frame 420. For example, the user may select both the zoom button 100 and a panning button 80, may press and hold the zoom button, or other actions may be utilized as defined by a programmer.

In accordance with one embodiment, the eight panning buttons 80 of the handheld computing device 120 (FIG. 9) may be used for automatic panning. Four of the panning buttons 80 are located at the corners (e.g., one in each corner, North East, South East, South West and North West), and the other four are located between the corner panning buttons 80. Upon depressing any of the four corner panning buttons 80, the handheld computing device 20 pans and displays the associated corner region of the virtual desktop 320 in the native resolution of the display 128 (e.g., in zoomed in mode). Depressing any of the center panning buttons 80 (located, as described above, between the corner buttons) displays the centered side of the virtual desktop 320 in the native resolution of the display 128. If desired, a function may be provided for showing the center of the virtual desktop 320, such as pressing and holding one or more of the panning buttons 80. This embodiment enables the user to quickly access the different areas of the virtual desktop 320 via hardware buttons (e.g., the panning buttons 80), and provides quick access to the most frequent views.

If desired, instead of instantly panning to a corner or side of a respective panning button 80, pressing a panning button 80 may cause smooth panning from a current position toward the pressed panning button 80. For example, if the lower left corner of the virtual desktop 320 is initially displayed, pressing the panning button 80 in the upper left corner of the display device 350 causes the virtual desktop 320 to smoothly pan to show its upper left corner. Pressing the panning button 80 in the upper right corner of the display device 350 causes the virtual desktop 320 to smoothly pan to show its upper right corner. The panning buttons 80 in the lower left and lower right corners of the display device 350 function similarly, as do the panning buttons positioned between the corner panning buttons.

The embodiment shown in FIG. 8 illustrates that a task bar 390 (e.g., a "start bar" such as that in the Microsoft Windows XP operating system) may be displayed along one edge of the displayed image when the portion 330 is rendered. Although the task bar 390 depicted in this example resides beneath the virtual desktop 320, it is to be understood that the task bar 390 could be placed at any desired location on the display device 350 (e.g., along a top or side edge if so desired). In accordance with one embodiment, the task bar 390 remains available and in the same position regardless of the portion 330 visible in the displayed image 350.

If desired, as with other features of the invention, the task bar 390 may be positioned over the portion 330 of the virtual desktop 320 shown in the displayed image 350. The task bar 390 may be persistent or may be configured so that it may be hidden. If persistent, the task bar 390 may take a permanent area of the display 28, leaving the rest of the display for showing the displayed image 350. However, in accordance with an embodiment of the invention, the task bar 390 covers a portion of the displayed image 350, but the displayed image is at least partially viewable therethough; i.e., the task bar 390 is translucent. If the task bar 390 is translucent, such as is shown in FIG. 11, persistent access to both the displayed image 350 and controls on the task bar 390 are provided. The task bar 390, which may be the same width as the display 28 (e.g., 640 pixels) floats over the surface of the entire displayed image 350. Grabbing and dragging the displayed image 350, such as is described with FIGS. 12 and 13, causes the virtual desktop 320 to slide underneath the stationary task bar 390.

Users may hide or display the task bar 390, for example via a hardware task bar button 410 (FIG. 9). This task bar button 410 has toggle functionality. Other features may be used to display the task bar 390, such as hardware button combinations or actions taken with respect to the display 28. If the task bar 390 is hidden, the user may choose to automatically have the task bar 390 appear on the virtual desktop 320 momentarily upon an action or actions, such as an incoming instant message or for the display of an Operating System notification.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any nonclaimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. Headings are used herein for organizational purposes only are not meant to limit the interpretation of the specification of the claims.

What is claimed is:

1. A computer-readable medium having computer-executable instructions, the instructions comprising instructions for performing the following:
   (a) displaying a desktop on a display;
   (b) displaying a map pane over a portion of the desktop, wherein the map pane includes an internal frame;
   (c) increasing the opacity of the map pane in response to detecting a cursor over the map pane; and
   (d) panning the desktop in response to detecting the cursor dragging the frame within the map pane.

2. The computer-readable medium of claim 1, wherein (a) comprises displaying a first portion of a virtual desktop, wherein (d) comprises displaying a second portion of the virtual desktop, wherein the virtual desktop is larger than the first portion or second portion.

3. The computer-readable medium of claim 2, wherein the map pane comprises a scaled down image of the virtual desktop.

4. The computer-readable medium of claim 3, wherein the portion of the scaled image of the desktop within the frame in the map pane corresponds to the portion of the virtual desktop displayed on the screen.

5. The computer-readable medium of claim 2, further comprising instructions for performing the following:
   moving the map pane to a different position on the desktop in response to the cursor dragging the map pane.

6. The computer-readable medium of claim 5, further comprising instructions for performing the following:
   providing audio feedback in response to detecting the frame being dragged against the frame.

7. The computer-readable medium of claim 2, further comprising instructions for performing the following:
   playing a sound in response to detecting a panning operation.

8. The computer-readable medium of claim 2, wherein the map pane acts as a bound on where the frame can be dragged.

9. The computer-readable medium of claim 2, wherein the desktop acts as a bound on where the map pane can be dragged.

10. The computer-readable medium of claim 9, further comprising instructions for performing the following:
    hiding the task bar when the cursor is not over the task bar;
    displaying the task bar in response to the cursor floating in a particular region; and
    moving the map pane to a new position to prevent the task bar from overlapping the map pane.

11. The computer-readable medium of claim 9, further comprising instructions for performing the following:
    hiding the task bar when the cursor is not over the task bar;

displaying the task bar in response to the cursor floating in a particular region; and displaying the map pane over the task bar if the task bar and map pane overlap.

12. The computer-readable medium of claim 9, further comprising instructions for performing the following:

storing per-user preferences for the location of the map pane.

13. The computer-readable medium of claim 2, further comprising:

wherein the map pane defaults to a predetermined position on the desktop.

14. The computer-readable medium of claim 2, further comprising instructions for performing the following:

displaying a task bar on the desktop, wherein the task bar acts as a bound on where the map pane can be dragged.

15. The computer-readable medium of claim 2, wherein the map pane's position on the desktop is fixed and not changeable.

16. The computer-readable medium of claim 2, wherein the size of the map pane is adjustable by the user, wherein the frame size is adjusted to maintain a fixed ratio of the size of the map pane.

17. The computer-readable medium of claim 2, wherein the map pane provides a birds eye view of the virtual desktop.

18. The computer-readable medium of claim 2, wherein (d) comprises updating the desktop with different portions of the virtual desktop as the frame is dragged.

19. The computer-readable medium of claim 2, wherein (d) comprises waiting to update the desktop with a different portion of the virtual desktop until the frame dragging is completed.

20. The computer-readable medium of claim 2, wherein the map pane comprises a scaled down image of the virtual desktop, wherein the scaled down image of the virtual desktop is calculated once per screen refresh.

21. The computer-readable medium of claim 2, wherein the map pane comprises a scaled down image of the virtual desktop, wherein the scaled down image of the virtual desktop is calculated at the end of each frame drag operation.

22. A computer-readable medium having computer-executable instructions, the instructions comprising instructions for performing the following:

(a) displaying a desktop on a display;

(b) in response to detecting a map pane display input signal from the user;

(1) displaying a map pane over a portion of the desktop, wherein the map pane includes an internal frame; and (2) panning the desktop in response to detecting the cursor dragging the frame within the map pane;

(c) in response to detecting the end of the map pane display signal, hiding the map display pane.

23. The computer-readable medium of claim 22, wherein the map pane display signal is a key press and mouse click combination.

24. The computer-readable medium of claim 23, wherein the map pane is displayed at a fixed location on the desktop.

25. The computer-readable medium of claim 23, wherein the map pane is displayed centered on the cursor position click location.

26. The computer-readable medium of claim 23, wherein a movement of the cursor during the display of the map pane drags the frame within the map pane.

27. The computer-readable medium of claim 23, wherein (a) further comprises displaying the map pane in the center of the desktop.

28. The computer-readable medium of claim 22, wherein the end of the map pane display signal is a key up or mouse up.

29. The computer-readable medium of claim 22, wherein the map pane display signal is a multiple concurrent key press combination.

30. The computer-readable medium of claim 22, wherein displaying a map pane over a portion of the desktop comprises gradually increasing the opacity of the map pane.

31. The computer-readable medium of claim 29, wherein (b) further comprises:

(3) panning the desktop in response to detecting the cursor dragging outside the map pane, wherein the panning of the desktop is in the direction of the cursor dragging movement.

32. A computer-readable medium having computer-executable instructions, the instructions comprising instructions for performing the following:

toggling between a first display state and a second display state in response to a zoom button press, wherein the first display state comprises displaying an entire desktop on a display, wherein the second display state comprises displaying a portion of the entire desktop on the display;

when in the second display state:

(a) in response to detecting a first pan button press, panning the desktop in a first direction; and (b) in response to detecting a second pan button press, panning the desktop in a second direction.

33. The computer-readable medium of claim 32, wherein the first direction corresponds to the position of the first pan button relative to the display, wherein the second direction corresponds to the position of the second pan button relative to the display, wherein the third direction corresponds to the position of the third pan button relative to the display, wherein the fourth direction corresponds to the position of the fourth pan button relative to the display.

34. The computer-readable medium of claim 32, further comprising instructions for performing the following:

when in the second display state, selecting a centered portion of the entire desktop for display in response to the pressing of a center button.

35. The computer-readable medium of claim 32, further comprising instructions for performing the following:

when in the second display state, panning the desktop in response to the cursor being dragged while a pan button is pressed, wherein the panning occurs in same direction that the cursor is being dragged.

36. The computer-readable medium of claim 32, further comprising instructions for performing the following:

toggling between a first toolbar state and a second toolbar state, wherein the first toolbar state comprises a hidden toolbar, wherein the second toolbar state comprises a displayed toolbar.

37. The computer-readable medium of claim 36, wherein the displayed toolbar is displayed over the desktop in a partially transparent manner, and wherein the toolbar dimensions do not change when the display state changes from the first display state to the second display state.

38. The computer-readable medium of claim 36, wherein the toolbar is anchored to a user-specifiable edge of the display device, and wherein the toolbar is a task bar.

39. The computer-readable medium of claim 32, wherein the first direction is up, wherein the second direction is down, wherein the third direction is left, wherein the fourth direction is right.

40. The computer-readable medium of claim 39, further comprising instructions for performing the following:
in response to detecting a fifth pan button press, panning the desktop in a fifth direction, wherein the fifth direction is diagonal corresponds to the position of the first pan button relative to the display.

41. The computer-readable medium of claim 32, wherein the first direction corresponds to the direction specified by a vector drawn from a first point at the approximate center of all the pan buttons to a second point at the first pan button.

42. A computer-readable medium having computer-executable instructions, the instructions comprising instructions for performing the following:
toggling between a first display state and a second display state in response to a zoom button press, wherein the first display state comprises displaying an entire desktop on a display, wherein the second display state comprises displaying a portion of the entire desktop on the display; and
when in the first display state, in response to detecting that the zoom button press is still pressed after a selected time interval;
(a) displaying a frame around the portion of the desktop that will be displayed in the second display state;
(b) in response to a mouse click, centering the frame around the cursor position;
(c) in response to a cursor drag, moving the frame in the direction of the cursor drag; and
(d) in response to detecting that the zoom button is no longer pressed, toggling to the second display state.

43. The computer-readable medium of claim 42, wherein the frame's movement is limited by the edges of the desktop.

44. The computer-readable medium of claim 42, further comprising instructions for performing the following, when in the first display state, in response to detecting that the zoom button press is still pressed after a selected time interval, changing the cursor.

45. The computer-readable medium of claim 42, further comprising instructions for performing the following:
performing a zooming operation to gradually scale and pan between the first display state and second display state.

46. A computer-readable medium having computer-executable instructions, the instructions comprising instructions for performing the following:
toggling between a first display state and a second display state in response to a zoom button press, wherein the first display state comprises displaying an entire desktop on a display, wherein the second display state comprises displaying a portion of the entire desktop on the display;
when in the second display state:
in response to a pan button press and a cursor drag, panning the desktop in the direction of the cursor drag;
when in the first display state:
in response to a pan button press:
(1) displaying a frame around the portion of the desktop that will be displayed in the second display state;
(2) in response to a mouse click, centering the frame around the cursor position;
(3) in response to a cursor drag, moving the frame in the direction of the cursor drag; and
(4) in response to detecting that the pan button is no longer pressed, toggling to the second display state.

47. The computer-readable medium of any of claims 1 through 46, wherein panning the desktop comprises shifting which portion of the entire desktop is displayed without changing which percentage of the entire desktop is displayed.

48. The computer-readable medium of any of claims 1 through 46, wherein zooming the desktop comprises changing which percentage of the entire desktop is displayed.

* * * * *